United States Patent [19]

Schmitz

[11] Patent Number: 5,435,615

[45] Date of Patent: Jul. 25, 1995

[54] LOCKING DEVICE FOR CONVERTIBLE TOPS

[75] Inventor: Hermann Schmitz, Meppen, Germany

[73] Assignee: Wilhelm Karmann GmbH, Osnabrueck, Germany

[21] Appl. No.: 191,845

[22] Filed: Feb. 4, 1994

[30] Foreign Application Priority Data

Feb. 17, 1993 [DE] Germany ............ 93 02 292 U

[51] Int. Cl.⁶ .............................. B60J 7/00; E05C 5/02
[52] U.S. Cl. .................................. 296/121; 292/113;
292/DIG. 5
[58] Field of Search ................ 296/107, 121, 224;
292/113, DIG. 5, DIG. 30

[56] References Cited

U.S. PATENT DOCUMENTS

| | | | |
|---|---|---|---|
| 3,129,025 | 4/1964 | Krueger | 292/DIG. 5 |
| 3,216,763 | 11/1965 | Heincelman | 296/121 |
| 3,348,876 | 10/1967 | Pollak et al. | 296/121 |
| 4,817,999 | 4/1989 | Drew | 292/DIG. 5 |

FOREIGN PATENT DOCUMENTS

| | | | |
|---|---|---|---|
| 301193 | 2/1989 | European Pat. Off. | 295/121 |
| 492006 | 7/1992 | European Pat. Off. | 296/121 |
| 2027792 | 2/1980 | United Kingdom | 296/224 |

Primary Examiner—Dean J. Kramer
Attorney, Agent, or Firm—Jordan and Hamburg

[57] ABSTRACT

A locking device for convertible tops has a four-joint construction with a support frame connected to the roof, a handle, a joint bracket and a lever. At the extended end of the lever, a locking hook, which can be swiveled around an axis, is fastened. This locking device is modified so that a precise control of the locking hook, and with that, a convenient course of operations during the closing of the top becomes possible and, moreover, accident safety is improved. For this purpose, a connecting-link guidance and a spring, which exerts a torque on the hook, are provided for the locking hook.

20 Claims, 5 Drawing Sheets

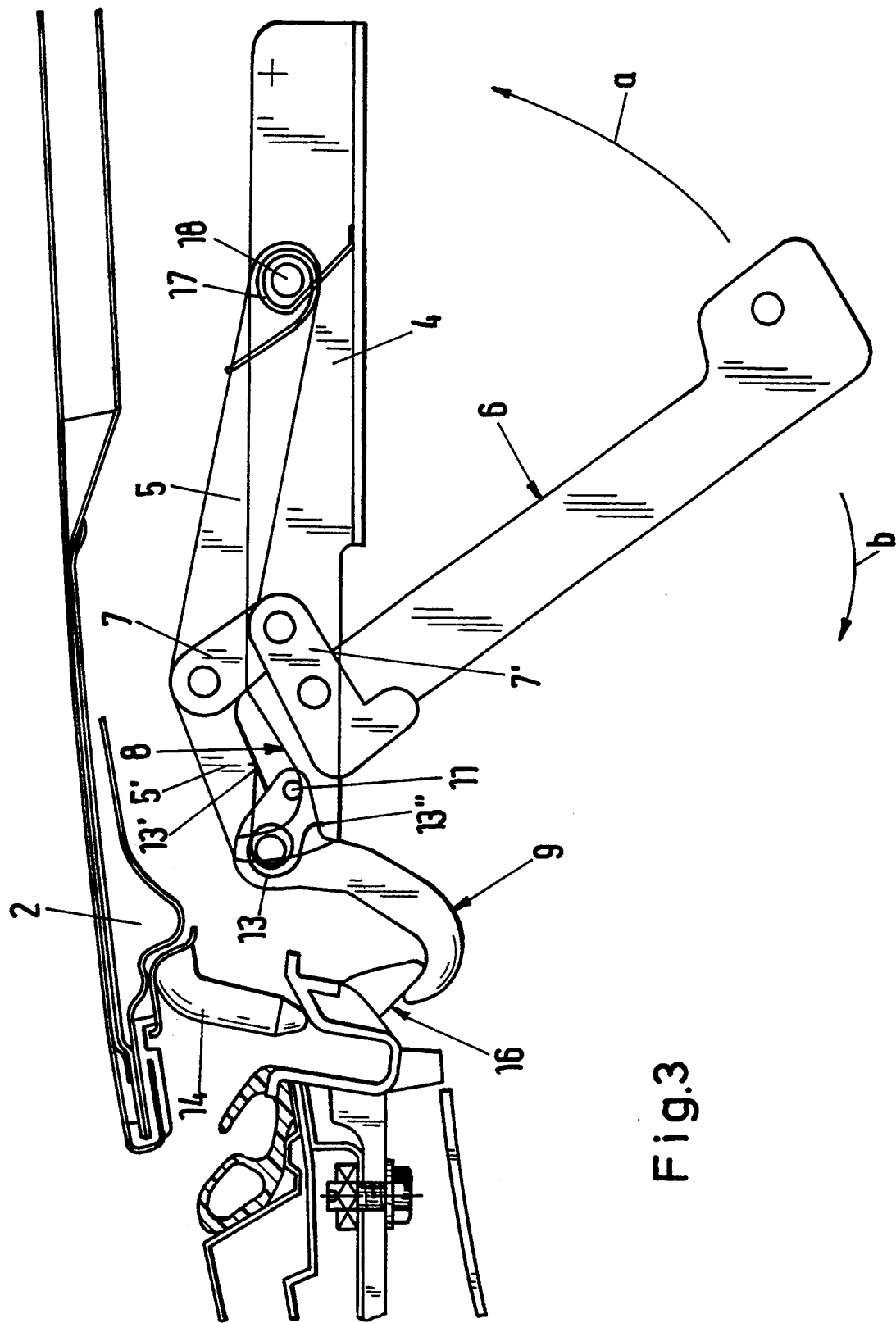

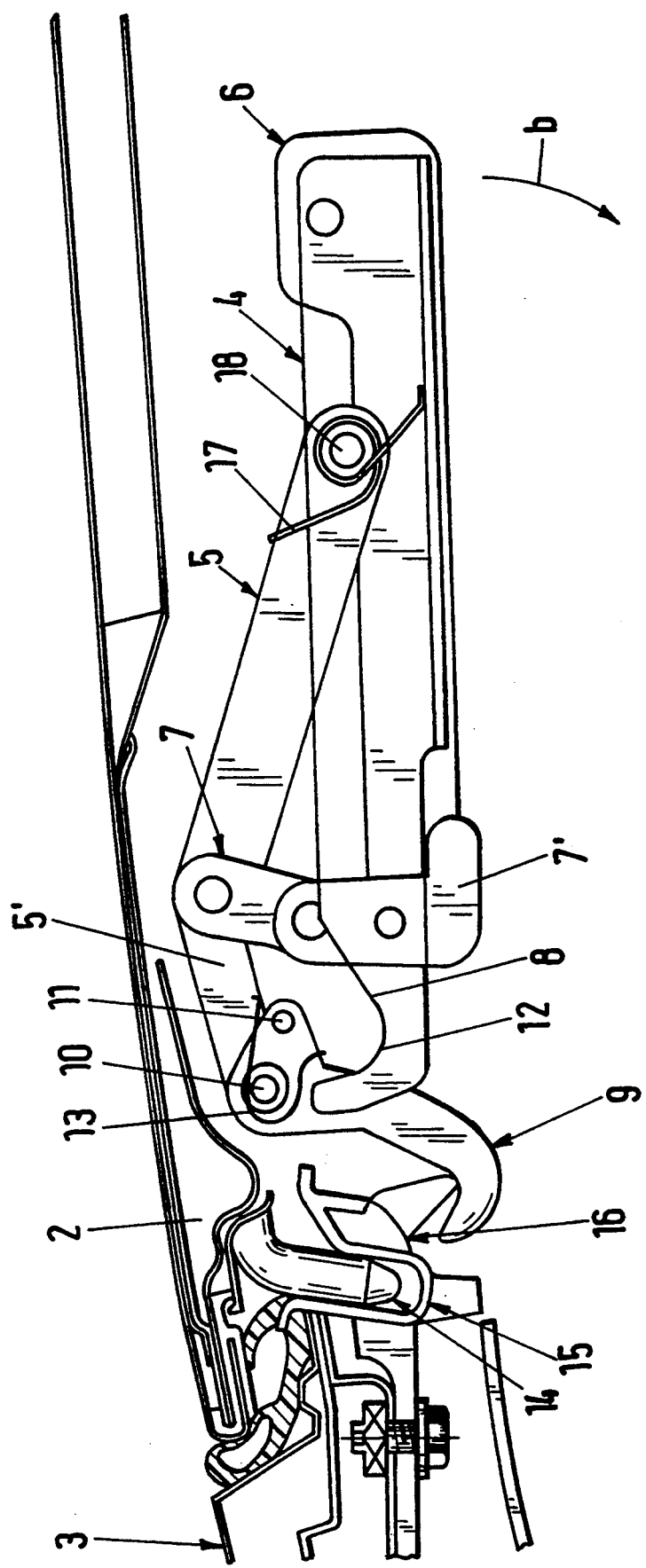

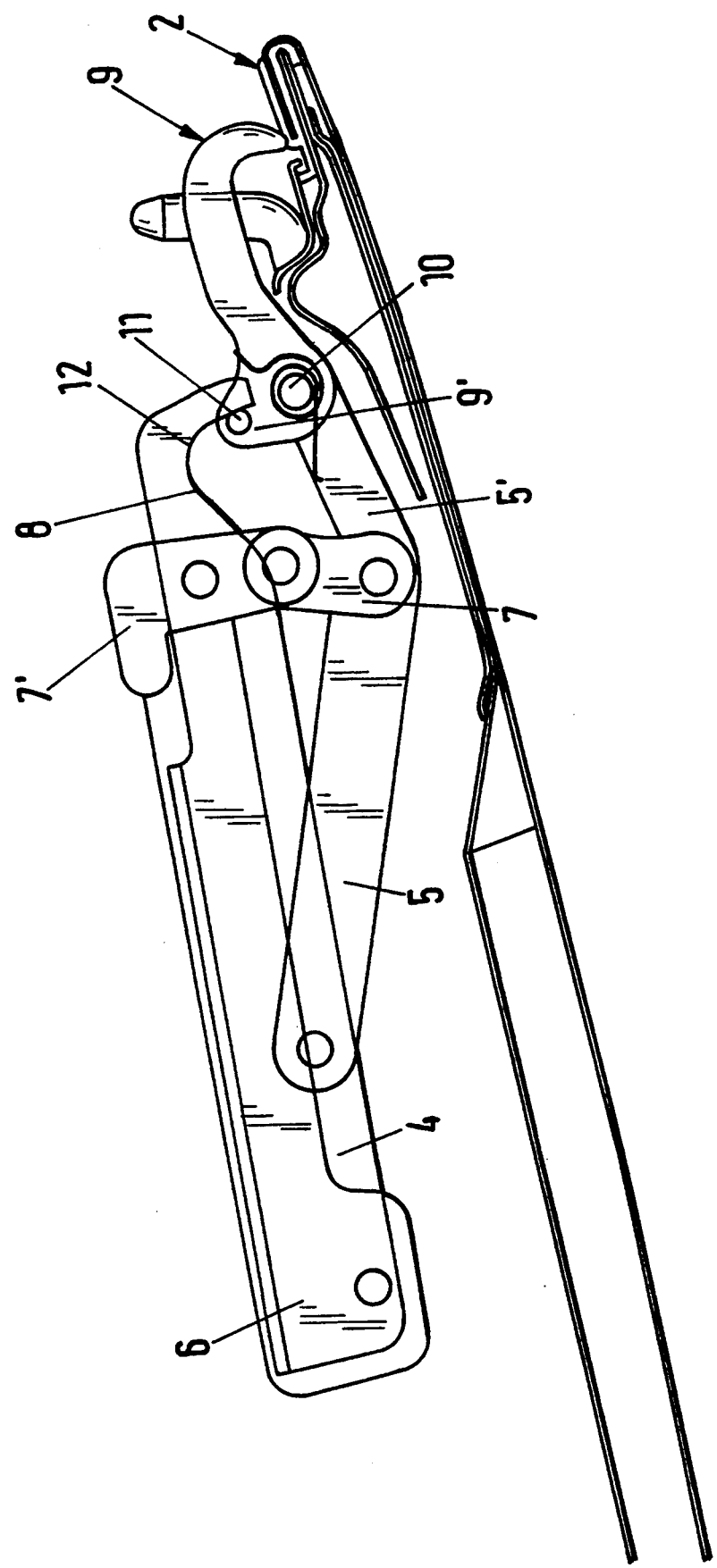

5,435,615

LOCKING DEVICE FOR CONVERTIBLE TOPS

BACKGROUND OF THE INVENTION

The invention relates to a locking device for convertible tops.

In the case of a known locking device, the control of the draw hook is not particularly precise and, in practice, before the hood is pulled down and closed by operating the lever, the draw hook must be pushed by hand into the end support. Moreover, when the top is opened, the position of the hook is not fixed at the tip of the roof; instead, the hook stands perpendicularly upwards when the top is opened.

SUMMARY OF THE INVENTION

It is an object of the invention to modify the locking device of the initially mentioned type in such a way that a precise control of the locking hook and, with that, a more convenient course of operation when closing the top become possible and, in addition, accident safety is improved.

Due to the inventive combination of the connecting-link guidance and the spring, the course of motion of the locking hook is fixed unambiguously, and the movements of the handle and the locking hook are related to one another unambiguously. By these means, a precise control of the locking hook is provided in particular, a more convenient operation when closing and opening the top becomes possible due to the invention. The locking hook no longer has to be pushed into the end support by hand; instead, merely operating the handle with one hand is sufficient for closing and opening the top.

Still further advantages arise out of the inventive development of the closing device. For example, when the top is closed, the hook is pressed by the spring from below into an end support, so that the hook cannot be detached even when strong pressure is exerted from the outside against the tip of the roof; this represents an additional safeguard against theft. In addition, the position of the locking hook is fixed at the tip of the roof, when the top is open. If namely, after the top is opened, the handle is turned into a position parallel to the supporting frame, the locking hook lies against the tip of the roof when the top is open, so that the danger of an accident is reduced.

An embodiment of the object of the invention is described in greater detail below by means of the accompanying drawings.

BRIEF DESCRIPTION OF THE DRAWINGS

FIG. 3 is a side view similar to that of FIG. 1, however, after the locking hook is caught in the end support;

FIG. 4 is a side view similar to that of FIGS. 1 and 3 with the locking device in the closed position; and FIG. 5 is a side view of the locking device with the top opened completely.

DESCRIPTION OF THE PREFERRED EMBODIMENTS

Figure 1:
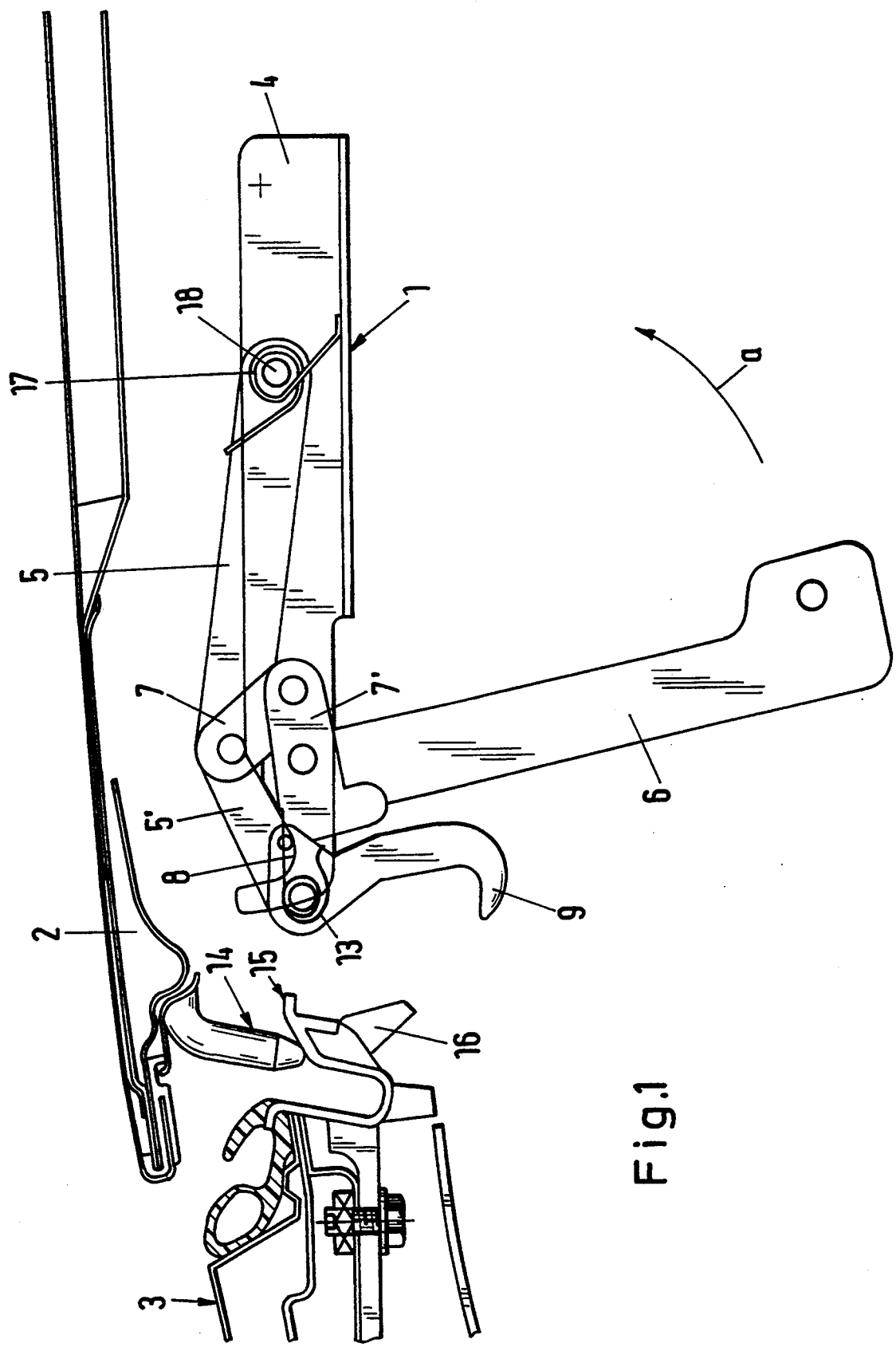
FIG. 1 is a side view of the locking device in a position in which the convertible top is brought almost into the closed position.

FIG. 1 shows a side view of a locking device 1 and the tip 2 of a roof of the convertible top in the upper frame of a windshield 3.

Figure 2:
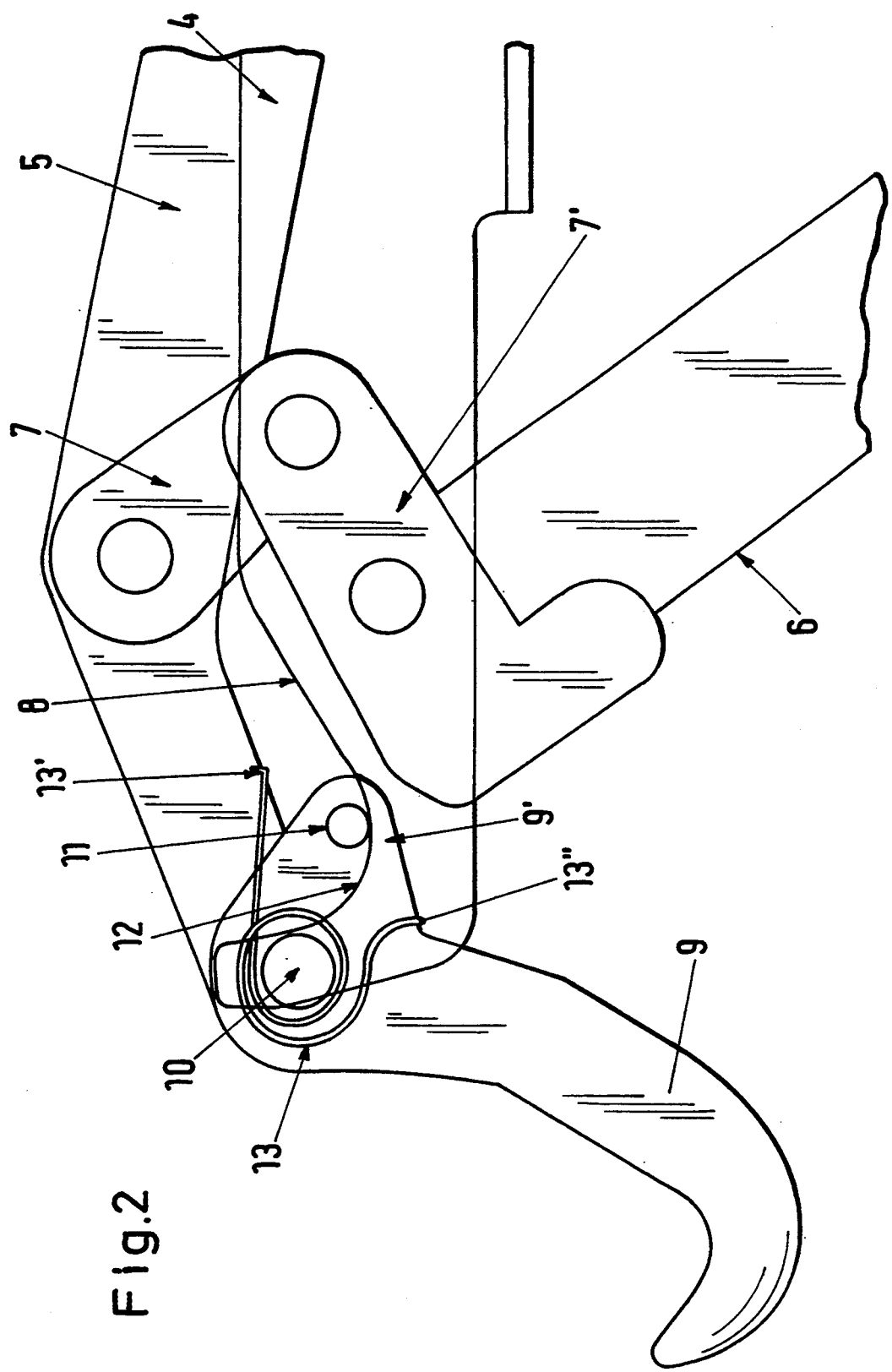
FIG. 2 is an enlarged view of the front area of the locking device with connecting-link guidance and locking hook.

The locking device 1 consists of a supporting frame 4, a lever 5, 5', a handle 6, a joint bracket 7, a connecting-link guidance 8 and a locking hook 9. The connecting-link guidance 8 for the locking hook 9 can be seen in detail in FIG. 2. The end of the lever 5 with the locking hook 9 pivoted about the swiveling axis 10, the upper part of the handle 6, the joint bracket 7, as well as the front part of the supporting frame 4 are shown. At a shoulder 9' pointing backwards from the swiveling axis 10, the locking hook 9 has a guide pin 11, which lies on a guide curve 12 of the connecting-link guidance 8, which advisably is formed on the supporting frame 4. At 13', a spring 13 engages a lever 5'. As shown in the drawing, the spring 13 is coiled counter-clockwise about the swiveling axis 10 and engages at 13" the upper region of the locking hook 9. The spring 13 produces a torque in the clockwise direction of the drawing on the hook 9, as a result of which the latter is pre-tensioned in the closing direction and the guide pin 11 is pressed against the guide curve 12 of the connecting-link guidance 8.

If, as is shown particularly in FIG. 3, the handle 6 is moved into the closed position (arrow a), the lever 5, 5' is raised by the four-joint system formed, in all, by the parts 4, 5, 5', 6, 7, 7'. Due to the motion of the lever 5, 5' with the swiveling axis 10 and the locking hook 9, as well as due to the spring 13 and the shape of the guide curve 12, a constraint is exerted in the sense that the locking hook 9 carries out a swiveling motion in the clockwise direction corresponding to the drawing. If the handle 6 is operated for opening the top (arrow direction b), the lever 5, 5' is lowered and the locking hook 9 moves over the guide pin 11 along the guide curve 12 in the counterclockwise direction corresponding to the drawing, that is, it moves from the position shown in FIG. 3 back into the position shown in FIG. 1. At the same time, due to the shape of the guide curve 12 which may have a configuration which is approximately the shape of a portion of a hyperbola, and the motion of the swiveling axis 10 at the lever 5, 5' and of the locking hook 9, a torque, which acts against the spring torque, is exerted on the guide pin 11.

FIG. 1 shows the position of the locking device of the top before the closing process. A centering peg 14 at the top is pulled onto an inlet funnel 15. The locking hook 9 is in the catch position. FIG. 3 shows the further course of the motion. By turning the handle 6 through about 15° in the closing direction a, the locking hook 9 is hooked into an end support 16. So that the locking hook 9 and the handle 6 are held in this position for catching the hook, a spring 17 is provided in a bearing 18. The spring 17 exerts a force on the lever 5 in such a manner, that the lever 5 is pressed downwards and therefore, when the handle 9 is turned in the closing direction, a counter-force must be overcome.

During this turning motion, the position of the centering peg 14 has remained unchanged. By turning the handle 6 further in the direction a, the distance between the tip 2 of the roof and the windshield 3 is decreased and the centering peg 14 is forced into the inlet funnel 15. The locking hook 9 is now firmly hooked into the end support 16. Because the locking hook 9 is fixed by the end support 16, the guide pin 11, as the handle 6 is turned further, runs out of the guide curve 12 of the connecting-link guidance 8, as can be seen particularly in FIG. 4. The locking hook 9 is secured over the four-joint system and its lever 5, 5' with the end support and is furthermore pressed by the spring 13 against the end support 16. Accordingly, the locking hook 9 cannot come loose even when pressure is exerted on the roof tip 2.

FIG. 5 shows the position of the locking hook 9 when the convertible top is open completely. This position is reached if, starting out from the closed position of FIG. 4, the handle 6 is turned in the arrow direction b and the top is moved to the right over the position shown in FIGS. 3 and 1 and folded over into the open position. If the handle 6 is then brought once again into the closed position parallel to the supporting frame 4, the locking hook 9 lies against the roof tip 2 and thus no longer forms a source of danger.

The object of the invention is not limited to the embodiment described above by means of the drawing; rather, modifications are entirely conceivable and possible within the scope of the claims.

What I claim is:

1. A locking device for a convertible top of a vehicle comprising a support frame on said convertible top, a handle pivotably mounted on said support frame for pivotal movement about a first pivotal axis, a lever pivotably mounted on said support frame for pivotal movement about a second pivotal axis parallel to said first pivotal axis, linkage means between said handle and said lever such that pivoting of said handle about said first pivotal axis effects pivoting of said lever about said second pivotal axis, a locking hook pivotably mounted on said lever, a guide means on said support frame, and biasing means biasing said locking hook into biasing engagement with said guide means.

2. A locking device according to claim 1, wherein said locking hook comprises a hook-shaped part and an engageable part, said hook-shaped part being engageable with said vehicle body, said engageable part being biased against said guide means by said biasing means.

3. A locking device according to claim 1 wherein said guide means comprises a guide surface which controls pivoting of said locking hook when said handle means effects pivoting of said lever.

4. A locking device according to claim 3 wherein said guide means comprises a guide surface having a configuration which is approximately the shape of a portion of a hyperbola.

5. A locking device according to claim 1 wherein said locking hook has a locked pivotal position in which said locking hook lockingly engages said vehicle, said locking hook being pivotal from said locked pivotal position to an unlocked pivotal position in which said locking hook is disengaged from said vehicle, the pivotal direction from said disengaged pivotal position to said locked pivotal position being designated a locking pivotal direction, said biasing means biasing said locking hook in said locking pivotal direction.

6. A locking device according to claim 1 wherein said lever has a front end portion and a rear end portion, said rear end portion being pivotably mounted on said support frame for pivotable movement about said second pivotal axis, said locking hook being pivotably mounted on said front end portion for pivotal movement about a third pivotal axis.

7. A locking device according to claim 1 wherein said lever has a front end portion, a rear end portion and an intermediate portion, said lever being pivotably mounted on said support frame at said rear end portion for pivotable movement about said second pivotal axis, said locking hook being pivotably mounted on said lever at said front end portion for pivotal movement about a third pivotal axis, said linkage means being pivotably mounted on said lever at said intermediate portion.

8. A locking device according to claim 1 further comprising biasing means between said lever and said support frame biasing said lever in one pivotal direction.

9. A locking device according to claim 1 wherein said handle is pivotal from an initial handle position to an intermediate handle position, said lever being pivoted from an initial lever position to an intermediate lever position when said handle is pivoted from said initial handle position to said intermediate handle position, said locking hook pivoting from an initial locking hook position to an intermediate locking hook position when said lever is pivoted from said initial lever position to said intermediate lever position, said locking hook being spaced from said vehicle when in said initial locking hook position, said locking hook engaging said vehicle when in said intermediate locking hook position.

10. A locking device according to claim 9 wherein said locking hook comprises an engageable means which is engageable with said guide means, said biasing means biasing said engageable means into biasing engagement with said guide means as said handle moves from said initial handle position to said intermediate handle position.

11. A locking device according to claim 9 wherein said handle is movable from said intermediate handle position to a locked handle position, said locking hook being moved from said intermediate locking hook position to a locked locking hook position where said handle is moved from said intermediate handle position to said locked handle position, said locking hook locking the convertible top to the vehicle when said locking hook is in said locked locking hook position, said locking hook being separated from said guide means when said locking hook is in said locked locking hook position.

12. A locking device according to claim 11 wherein said locking hook is biasingly engaged with said guide means by said biasing means when said locking hook is in said initial locking hook position and in said intermediate locking hook position.

13. A locking device according to claim 1 wherein said locking hook is pivotably mounted on said lever for pivotal movement about a third axis which is parallel to said first and second pivotal axis.

14. A locking device according to claim 1 wherein said linkage means comprises two link elements pivotably connected to one another for pivotal movement about a pivotal axis which is parallel to the first and second pivotal axis.

15. A locking device according to claim 1 wherein said linkage means is pivotably mounted on said lever for pivotable movement about a pivotable axis which is parallel to said first and second pivotal axis.

16. A locking device according to claim 1 wherein said linkage means is pivotably mounted on said support frame for pivotable movement about a pivotal axis which is parallel to said first and second pivotal axis.

17. A locking device for a convertible top of a vehicle comprising a support frame on said convertible top, a handle pivotably mounted on said support frame, a lever pivotably mounted on said support frame, linkage means between said handle and said lever such that pivoting of said handle effects pivoting of said lever, a locking hook pivotably mounted on said lever, a guide means on said support frame, biasing means biasing said locking hook into biasing engagement with said guide means, said lever being pivotably mounted on said support frame about a first pivotal axis, said handle being pivotably mounted on said support frame about a second pivotal axis spaced from said first pivotal axis, said linkage means comprising a pair of pivotal links, one of said pivotal links being pivotably mounted on said lever, the other of said pivotal links being pivotably mounted on said support frame for pivotal movement about said second axis.

18. A locking device for a convertible top of a vehicle comprising a support frame on said convertible top, a handle pivotably mounted on said support frame for pivotal movement about a first pivotal axis, a lever pivotably mounted on said support frame for pivotal movement about a second pivotal axis, linkage means between said handle and said lever such that pivoting of said handle about said first pivotal axis effects pivoting of said lever about said second pivotal axis, a locking hook pivotably mounted on said lever for pivotal movement about a third pivotal axis parallel to said first pivotal axis, a guide means on said support frame, and biasing means biasing said locking hook into biasing engagement with said guide means.

19. A locking device for a convertible top of a vehicle comprising a support frame on said convertible top, a handle pivotably mounted on said support frame, a lever pivotably mounted on said support frame, linkage means between said handle and said lever such that pivoting of said handle effects pivoting of said lever, a locking hook pivotably mounted on said lever, a guide means on said support frame, biasing means biasing said locking hook into biasing engagement with said guide means, said handle being pivotal from an initial handle position to an intermediate handle position, said lever being pivoted from an initial lever position to an intermediate lever position when said handle is pivoted from said initial handle position to said intermediate handle position, said locking hook pivoting from an initial locking hook position to an intermediate locking hook position when said lever is pivoted from said initial lever position to said intermediate lever position, said locking hook being spaced from said vehicle when in said initial locking hook position, said locking hook engaging said vehicle when in said intermediate locking hook position, said handle being movable from said intermediate handle position to a locked handle position, said locking hook being moved from said intermediate locking hook position to a locked locking hook position when said handle is moved from said intermediate handle position to said locked handle position, said locking hook locking the convertible top to the vehicle when said locking hook is in said locked locking hook position, said locking hook being separated from said guide means when said locking hook is in said locked locking hook position, said convertible top having a projection and said vehicle having a recess adapted to receive said projection, said projection being disposed in said recess when said locking hook is in said locked locking hook position, said projection being juxtaposed to said recess when said locking hook is disposed is said intermediate locking hook position, said projection being spaced from said recess when said locking hook is in said initial locking hook position.

20. A locking device according to claim 19 wherein said vehicle has an engageable element, said locking hook engaging said engageable element when said locking hook is in said intermediate locking hook position and when in said locked locking hook position, said locking hook being separated from said engageable element when said locking hook is in said initial locking hook position.

* * * * *